United States Patent [19]

Kothmann et al.

[11] 4,342,816
[45] Aug. 3, 1982

[54] FUEL CELL STACK ARRANGEMENTS

[75] Inventors: Richard E. Kothmann, Churchill Boro; Edward V. Somers, Murrysville, both of Pa.

[73] Assignee: The United States of America as represented by the United States Department of Energy, Washington, D.C.

[21] Appl. No.: 256,419

[22] Filed: Apr. 22, 1981

[51] Int. Cl.³ .............................................. H01M 8/00
[52] U.S. Cl. ...................................... 429/13; 429/38; 429/120
[58] Field of Search ................... 429/38, 126, 13, 120, 429/34, 35

[56] References Cited

U.S. PATENT DOCUMENTS

| | | | |
|---|---|---|---|
| 3,394,032 | 7/1968 | Danner | 136/86 |
| 3,554,809 | 1/1971 | Craft | 136/86 |
| 3,801,374 | 4/1974 | Dews | 136/120 FC |
| 3,945,844 | 3/1976 | Nickols, Jr. | 136/86 R |
| 3,964,929 | 6/1976 | Grevstad | 136/86 R |
| 4,002,493 | 1/1977 | Warszawski | 429/26 |
| 4,074,020 | 2/1978 | Regnaut | 429/34 |
| 4,080,487 | 3/1978 | Reiser | 429/16 |
| 4,101,718 | 7/1978 | Tamura et al. | 429/26 |
| 4,169,917 | 10/1979 | Baker et al. | 429/26 |
| 4,182,795 | 1/1980 | Baker et al. | 429/13 |

Primary Examiner—Charles F. Lefevour
Attorney, Agent, or Firm—Z. L. Dermer

[57] ABSTRACT

Arrangements of stacks of fuel cells and ducts, for fuel cells operating with separate fuel, oxidant and coolant streams. An even number of stacks are arranged generally end-to-end in a loop. Ducts located at the juncture of consecutive stacks of the loop feed oxidant or fuel to or from the two consecutive stacks, each individual duct communicating with two stacks. A coolant fluid flows from outside the loop, into and through cooling channels of the stack, and is discharged into an enclosure duct formed within the loop by the stacks and seals at the junctures at the stacks.

7 Claims, 10 Drawing Figures

OXIDANT  FUEL  
COOLANT

OXIDANT  FUEL  
COOLANT

FUEL CELL STACK ARRANGEMENTS

GOVERNMENT CONTRACT

The Government of the United States has rights in this invention pursuant to Department of Energy Contract No. DE-AC03-78ET-11300.

CROSS-REFERENCE TO RELATED APPLICATIONS

This disclosure is closely related to U.S. Patent Application Ser. No. 144,089 in the name of R. E. Kothmann, entitled "Fuel Cell System Configurations", hereby incorporated by reference.

BACKGROUND OF THE INVENTION

1. Field of the Invention

This invention relates to arrangements of plural fuel cell stacks, and more particularly to ducting arrangements for stacks operating with separate fuel, oxidant and coolant streams.

2. Description of the Prior Art

Among the various types of fuel cell systems are those which include subassemblies of two bipolar plates between which is supported an acid electrolyte in a matrix. The subassemblies, herein referred to as fuel cells, are oriented one atop another and electrically connected, typically in series, to form a fuel cell stack. Operation of the fuel cell, for example, the reaction of hydrogen and oxygen to produce heat, electrical energy and water, is exothermic, and cooling of the cell components is necessary in order to maintain component integrity. Liquid or gaseous cooling fluids have therefore been passed through the stack to remove heat. Accordingly, three fluid mediums, a fuel, an oxidant and a cooling fluid flow in some manner into and out of the fuel cell stack.

As a result of system design limitations, such as the geometric configuration and the need to provide sufficient cooling of the cells, fluid streams have typically been combined or require relatively complex sealed ducting configurations to direct flow of the various fluid mediums. For example, systems have been proposed wherein the cooling fluid and oxidant are the same medium, such as air. Such systems require a high circulatory power, detracting from overall system efficiency, and can subject downstream components, such as heat exchangers, to undesirable materials such as corrosive acid, carried with the depleted oxidant. Further, in combined systems providing energy generation utilizing the heat removed from the fuel cell stack, it is desirable to recover the heat at a high temperature, which is limited by excessive air flow rates. Other systems, such as that described in U.S. Pat. No. 4,074,020, require flow paths which enter a longitudinal end of the stack, flow radially through selected sections of the stack, and are discharged longitudinally, creating multiple flow paths and large pressure drops. Multiple, spaced inlets and outlets also require complex ducting arrangements.

Control of the fluid mediums into and out of the fuel cell stacks is more complex where multiple stacks are utilized. Separate ducting to each stack, or to each discrete level in a stack, can result in a maze of interconnections. The connections can be simplified where the coolant and oxidant are the same medium. Proposed, for example, have been four rectangular stacks arranged generally in a square array with shorter ends near one another. Fuel flows from one shorter face of the rectangle to another, and the combined oxidant and coolant flows from one longer face of the rectangle to the other, providing a 90° cross flow of coolant and oxidant relative to the fuel. The assembly forms an inert duct-like central channel bounded by the four stacks. A single duct at each of two corners of the square array feeds fuel to two consecutive stacks, and a single duct at each of the remaining two corners withdraws fuel from two consecutive stacks. Combined coolant and oxidant flows from outside the square array, through the stacks, and into the central channel. The utilization of a combined coolant and oxidant flow stream severly limits the choice of coolant and the cooling capacity for the stacks.

SUMMARY OF THE INVENTION

This invention provides arrangements for conducting separate fuel, oxidant and coolant streams to and from a plurality of fuel cell stacks. Each stack is comprised of a plurality of fuel cells and is shaped in cross-section as an elongated polygon having pairs of oppositely disposed peripheral faces, one pair of which is longer than the others, and the distance between the preferably longer pair is shorter than the distance between any other pair. In preferred form, the stack is rectangular. An even number of stacks are arranged in an assembly with shorter faces generally end to end to form a closed loop. The outer and inner peripheries of the loop are thus formed of longer faces. Coolant is provided to the outer periphery of the loop, flows through the stacks, and is discharged into an enclosure duct within the center of the loop. The enclosure duct is formed by the longer faces and seals preferably positioned between the longer faces of consecutive stacks.

At alternate junctions of shorter faces, a duct conducts fuel to two consecutive stacks. At the same locations, another duct conducts oxidant from the two consecutive stacks. At the remaining alternate junctions, a duct conducts fuel from two consecutive stacks and another duct conducts oxidant into two consecutive stacks. The three fluid mediums, other than inlet coolant, are fed into or withdrawn from the ducts from the top, bottom or both the top and bottom, of the assembly of stacks.

In this manner, the number and complexity of ducts needed to transfer three distinct fluid streams to and from the assembly of plural fuel cell stacks is substantially simplified.

BRIEF DESCRIPTION OF THE DRAWINGS

The advantages, nature and additional features of the invention will become more apparent from the following description, taken in connection with the accompanying drawing, in which.

DESCRIPTION OF THE PREFERRED EMBODIMENTS

Figure 1:
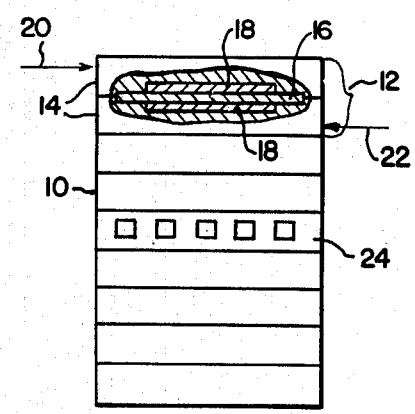
FIG. 1 is a simplified elevation view of a fuel cell stack.
Figure 8:
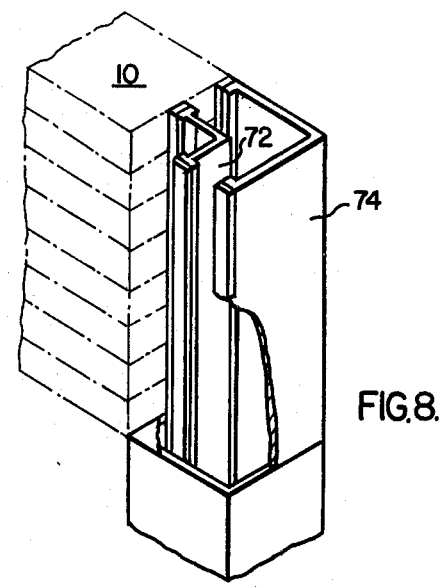
FIG. 8 is a perspective elevation view of a portion of the assembly of FIGS. 4 and 5.

Referring now to FIG. 1, there is shown a stack 10 of electrochemical devices such as fuel cells 12. As well known, a plurality of repeating cells 12 are stacked together and electrically connected, typically in series. Each individual cell 12, for purposes of description, includes plates 14 between which are sandwiched an electrolyte 16 and two electrodes 18. A fuel 20 and oxidant 22 pass through the cells, in reacting communication with the electrolyte, generating direct current electrical energy, heat, and other reaction products. A coolant is also typically circulated through each cell 12 or, as shown, through a cooling module 24 positioned among subpluralities of the cells 12 within the stack 10.

Figure 2:
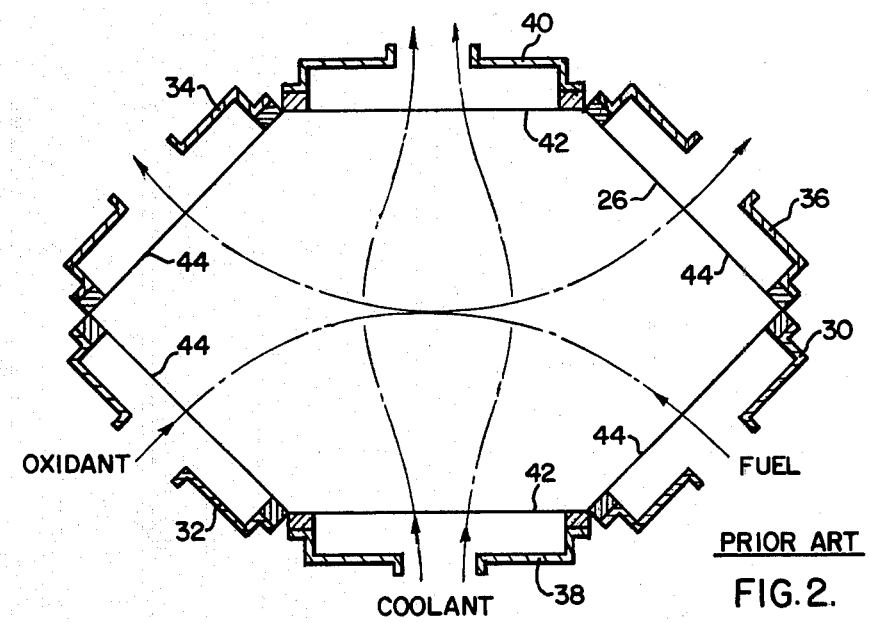
FIGS. 2 and 3 are simplified plan views, partially in section, showing prior ducting arrangements into fuel cell stacks.
Figure 3:
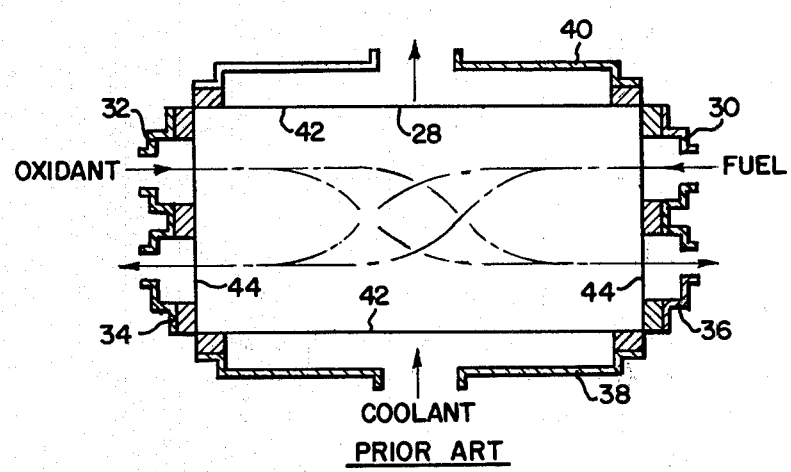

As described more fully in the cross-referenced application, it is desirable to shape the cells 12 and stacks 10 as elongated polygons having pairs of opposing faces. Exemplary elongated polygonal configurations include, as shown respectively in FIGS. 2 and 3, an elongated hexagonal stack 26 and a rectangular stack 28. In each configuration, fuel and oxidant enter a plurality of cells in a stack respectively through manifolds 30 and 32, flow through inlets on a peripheral face, through flow channels within the stack, and exit through outlets on the opposing peripheral face to respective manifolds 34 and 36. A coolant fluid flows from an inlet manifold 38, through inlets on a peripheral face, through internal channels, through outlets on the opposing peripheral face and to an outlet manifold 40, disposed on the elongated peripheral faces 42 of the stacks 26, 28. The distance between the elongated faces 42 is shorter than the distance between opposing pairs of shorter faces 44. The invention disclosed herein is particularly applicable to such elongated stack configurations, and is also useful with stacks of other cross-sectional shapes utilizing three separate fluid mediums.

Figure 4:
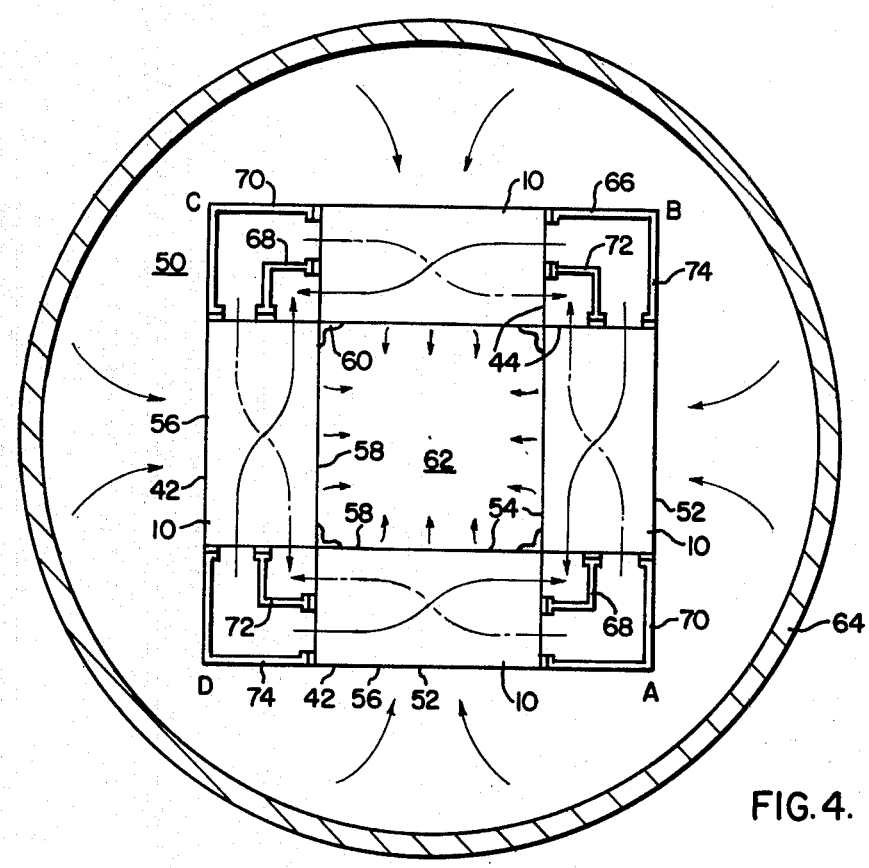
FIG. 4 is a simplified plan view of an assembly of fuel cell stacks and ducts in accordance with the invention.

In accordance with the invention, an even number, and at least four, fuel cell stacks 10 are arranged in a loop to form an assembly 50 (FIG. 4). The assembly 50 is arranged with shorter peripheral faces 44 generally end-to-end and near one another. Thus, paired sets of shorter faces 44 are formed about the assembly such as the paired sets at A, B, C and D. The elongated faces 42 thus form, generally, the outer 52 and inner 54 peripheries of the assembly 50 loop. Preferably, the coolant inlet faces 56 of the stack form the major portion of the outer periphery 52 of the assembly 50, and the coolant outlet faces 58 form the major portion of the inner periphery.

Figure 4A:
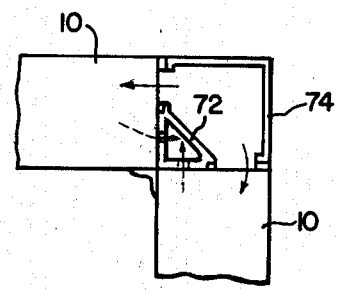
FIGS. 4A and 4B are partial plan views of alternate duct and stack configurations.
Figure 4B:
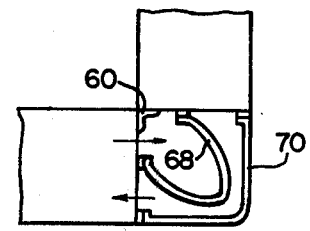

Consecutive stacks 10 in the loop assembly 50 are sealed to one another, for example, by gaskets 60 positioned the full length of consecutive coolant outlet faces 58 within the interior of the loop assembly 50. The gaskets 60 can also be positioned outside the interior of the loop assembly, as shown in FIG. 4B. For an exemplary phosphoric acid fuel cell system wherein hydrogen is the fuel, air is the oxidant and helium is the coolant, the gaskets 60 can be comprised of VITON, a fluorocarbon material commercially available from the DuPont Corporation. Thus, the gaskets 60 and the coolant outlet faces 58 together form an enclosure duct 62 into which coolant from the stacks forming the assembly 50 is discharged. A complete structural duct, having appropriate openings at the coolant outlets along the coolant outlet faces 58, can also be sealed to and mechanically fastened within the enclosure region formed within the assembly 50 of stacks 10. The coolant fluid can be conducted into individual stacks 10, but preferably, one or more assemblies 50 are disposed within a containing vessel 64 and coolant under pressure flows within the vessel about, into and through the stacks 10. The stacks of an assembly 50 can also be rotated 180° such that coolant fluid is ducted into the central enclosure duct 62, through the stacks and outwardly into the vessel.

Figure 7:
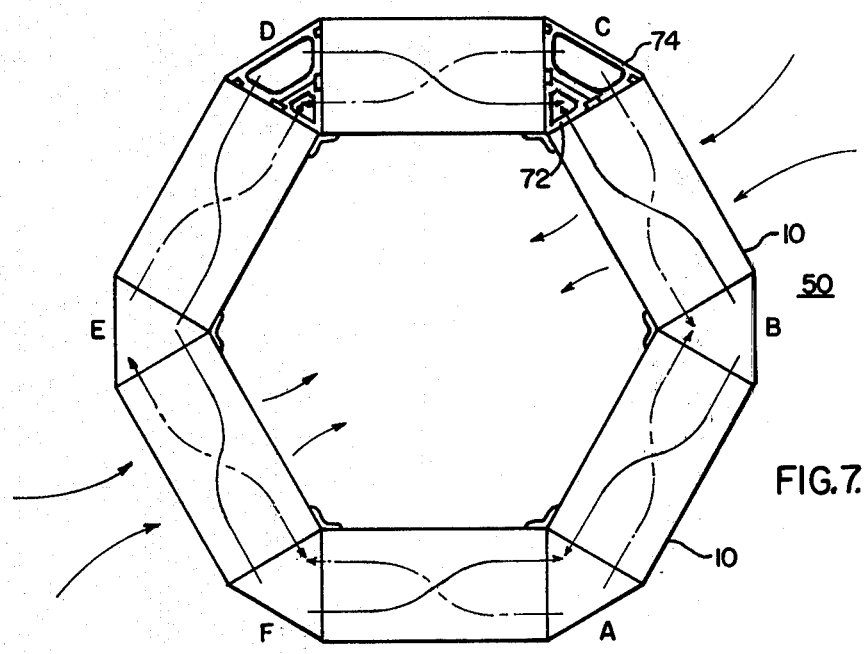

At each juncture forming the paired sets A, B, C, D are full length ducts 66 for feeding fuel and oxidant to and from the stacks 10. The ducts 66 can be "twosided", with the balance of the duct cross section formed by the faces of two adjacent stacks 10, as shown in FIG. 4, or can be complete structural members, with appropriate holes at the fuel and oxidant inlets and outlets, sealed and affixed to the two adjacent stacks 10, as shown in FIG. 7. Each duct 66 communicates with both of the stacks 10 forming a paired set. The ducts 66 at alternate paired sets (A,C and B,D) are similar as to the fluid conducted. For example, ducts 68 at set A and set C are both oxidant outlet ducts, and ducts 70 are both fuel inlet ducts. Duct 68 thus receives oxidant discharging from two consecutive stacks. At the other alternate paired sets, set B and set D, are positioned a fuel outlet duct 72 and an oxidant inlet duct 74.

Although the ducts 66 are shown in FIG. 4 as having generally square corners, other shapes are equally compatible. It can, for example, be advantageous to provide the ducts conducting oxidant with larger interior flow areas than the ducts conducting fuel, since the oxidant flow rate is generally multiples of the fuel flow rate. Shapes as shown in FIGS. 4A and 4B can, for example, be utilized. The configuration shown in FIG. 4 also provides 180° cross flow of fuel and oxidant, based upon a Z-channel configuration within the cells and stacks. Other configurations are equally possible, such that the ducts 66 need not be sealed to the stacks 10 at a center line along a ace. Sealing of the ducts to the stacks can be accomplished similar to the manner shown in FIGS. 2 and 3, utilizing VITON gaskets 76 and well-known mechanical fastening means.

The ducts can be comprised of an electrically insulative material, such as polyphenolsulphide or polycarbonate foam, or can be metallic, for example, aluminum, properly insulated with a material such as Viton from direct electrical contact with the stacks.

Figure 5:
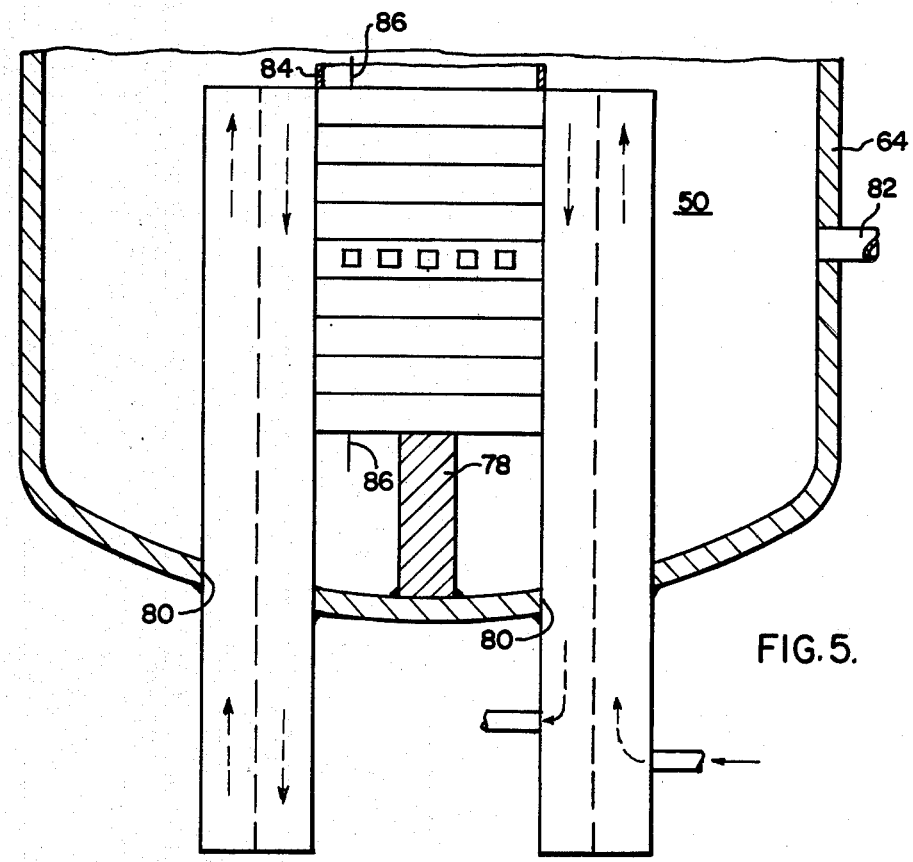
FIG. 5 is a simplified elevation view of the assembly of fuel cell stacks of FIG. 4.

As shown in FIG. 5, the assembly 50 can be supported within the vessel 64 from supports 78. The fuel and oxidant inlet and outlet ducts, or conduits connecting to these ducts, penetrate the vessel from bottom inlets 80, and cooling fluid enters from a side inlet 82. The formed enclosure duct 62 is preferably closed at the bottom, and coolant exits into a conduit 84. Also shown in FIG. 5 are electrical leads 86 which, as with fluid in conduit 84, exit the vessel 64 in any well-known manner. It will also be apparent that the formed enclosure duct 62, and any of the ducts 66, can be open at either one or both ends, and conduits connected accordingly.

Figure 6:
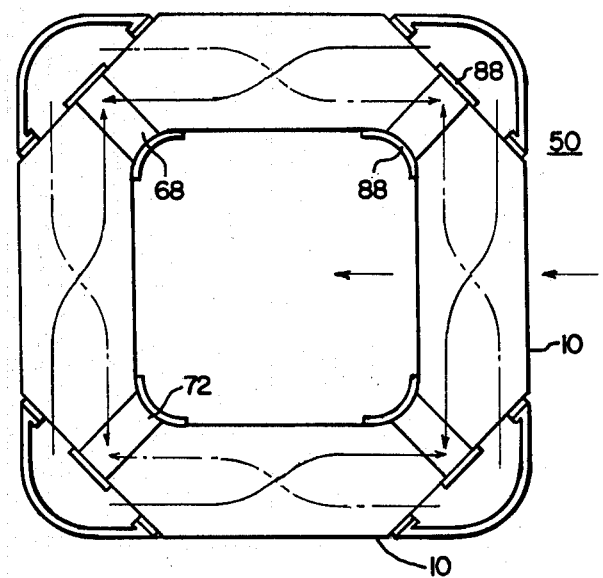
FIGS. 6 and 7 are plan views, similar to FIG. 4, of other embodiment assemblies of fuel cell stacks.

FIG. 6 shows another assembly 50 of four stacks 10, each stack shaped as an elongated hexagon and spaced from the next consecutive stack. The ducts 68, 72 are formed, along the length of the stacks, between seals 88 in the respective outlet faces of the stacks. Additional structural ducts, with appropriate holes, can be placed in these regions.

FIG. 7 shows an assembly 50 configuration of six stacks 10. The ducting structures at the alternate paired sets A, C and E are similar to one another. The other alternate paired sets, B, D, and F, are also similar to one another.

I claim:

1. An arrangement of fuel cell stacks, each said stack shaped in cross-section as a polygon having pairs of oppositely-disposed peripheral faces and including means for flowing a fuel therethrough from fuel inlets on a peripheral face to fuel outlets on an oppositely disposed peripheral face, means for flowing an oxidant therethrough from oxidant inlets on a peripheral face to oxidant outlets on an oppositely-disposed peripheral face, and means for flowing a coolant therethrough from coolant inlets on a peripheral face which is a different peripheral face than said fuel and oxidant peripheral faces to coolant outlets on a peripheral face which is a different peripheral face than said fuel and oxidant peripheral faces;

an even number, and at least four of said stacks being arranged in a loop such that said coolant inlet peripheral faces face outwardly of said loop and said coolant outlet peripheral faces face inwardly of said loop;

means for sealing among consecutive stacks of said loop such that the interior of said loop forms an enclosure duct;

means disposed at alternate junctures of said stacks for inletting fuel and outletting oxidant from two consecutive stacks of said loop;

means disposed at other alternate junctures of said stacks for inletting oxidant and outletting fuel from two consecutive stacks; and means for flowing a coolant to said coolant inlets, through said stacks, and into said enclosure duct.

2. An arrangement of fuel cell stacks, each said stack shaped in cross-section as a polygon having pairs of oppositely-disposed peripheral faces and including means for flowing a fuel therethrough from fuel inlets on a peripheral face to fuel outlets on an oppositely disposed peripheral face, means for flowing an oxidant therethrough from oxidant inlets on a peripheral face to oxidant outlets on an oppositely-disposed peripheral face, and means for flowing a coolant therethrough from coolant inlets on a peripheral face which is a different peripheral face than said fuel and oxidant peripheral faces to coolant outlets on a peripheral face which is a different peripheral face than said fuel and oxidant peripheral faces;

an even number, and at least four of said stacks being arranged in a loop such that said coolant inlet peripheral faces face inwardly of said loop and said coolant outlet peripheral faces face outwardly of said loop;

means for sealing among consecutive stacks of said loop such that the interior of said loop forms an enclosure duct;

means disposed at alternate junctures of said stacks for inletting fuel and outletting oxidant from two consecutive stacks of said loop;

means disposed at other alternate junctures of said stacks for inletting oxidant and outletting fuel from two consecutive stacks; and means for flowing a coolant to said enclosure duct, through said stacks, and outwardly from said stacks.

3. The arrangement of claim 1 or 2 wherein said means for inletting fuel and outletting oxidant from two consecutive stacks and said means for inletting oxidant and outletting fuel from two consecutive stacks comprise ducts, and wherein the internal flow area of said ducts for inletting and outletting oxidant is greater than the internal flow area of said ducts for inletting and outletting fuel.

4. An arrangement of fuel cell stacks, each said stack shaped in cross-section as an elongated polygon having pairs of oppositely disposed peripheral faces, at least one pair of said peripheral faces being longer than the remaining pairs and disposed such that the distance between said opposite longer pair of peripheral faces is shorter than the distance between the opposite peripheral faces of the remaining pairs, each said stack having means for flowing a fuel therethrough from one of said shorter peripheral faces to its opposite peripheral face, means for flowing an oxidant therethrough from one of said shorter peripheral faces to its opposite peripheral face, and means for flowing a coolant therethrough from inlets on one of said longer peripheral faces to outlets on the opposite longer peripheral face;

an even number, and at least four of said stacks being arranged in a loop such that shorter faces are positioned near one another forming paired sets, said coolant inlets face outwardly of said loop and said coolant outlets face inwardly of said loop;

means for sealing among consecutive stacks about said loop such that the interior of said loop forms in enclosure duct;

means disposed at alternate paired sets for inletting fuel to two consecutive stacks;

means disposed at other alternate paired sets for outletting fuel from two consecutive stacks;

means disposed at said alternate paired sets for outletting oxidant from two consecutive stacks;

means disposed at said other alternate paired sets for inletting oxidant to two consecutive stacks; and means for flowing a coolant to said coolant inlets, through said stacks, and into said enclosure duct.

5. An arrangement of fuel cell stacks, each said stack shaped in cross-section as a rectangle having oppositely disposed shorter peripheral faces and oppositely disposed longer peripheral faces, and including means for flowing a fuel therethrough from fuel inlets on one of said shorter peripheral faces to fuel outlets on the oppositely disposed shorter peripheral face, means for flowing an oxidant therethrough from oxidant inlets on one of said shorter peripheral faces to oxidant outlets on the oppositely disposed shorter peripheral face, and means for flowing a coolant therethrough from coolant inlets on one of said longer peripheral faces to coolant outlets on the oppositely disposed longer peripheral face;

an even number, and at least four of said stacks being arranged in a loop such that said longer coolant inlet peripheral faces face outwardly of said loop and said coolant outlet peripheral faces face inwardly of said loop;

means for sealing among consecutive stacks of said loop such that the interior of said loop forms an enclosure duct;

means disposed at alternate junctures of said stacks for inletting fuel and outletting oxidant from two consecutive stacks of said loop;

means disposed at other alternate junctures of said stacks for inletting oxidant and outletting fuel from two consecutive stacks;

and means for flowing a coolant to said coolant inlets, through said stacks, and into said enclosure duct.

6. An arrangement of fuel cell stacks, each said stack shaped in cross-section as an elongated hexagon having two pairs of oppositely disposed shorter peripheral faces and one pair of oppositely disposed longer peripheral faces, and including means for flowing a fuel therethrough from fuel inlets on one of said shorter peripheral faces to fuel outlets on the oppositely disposed shorter peripheral face, means for flowing an oxidant therethrough from oxidant inlets on one of said shorter peripheral faces to oxidant outlets on the oppositely disposed shorter peripheral face, and means for flowing a coolant therethrough from coolant inlets on one of said longer peripheral faces to coolant outlets on the oppositely disposed longer peripheral face;

an even number, and at least four of said stacks being arranged in a loop such that said longer coolant inlet peripheral faces face outwardly of said loop and said coolant outlet peripheral faces face inwardly of said loop;

means for sealing among consecutive stacks of said loop such that the interior of said loop forms an enclosure duct;

means disposed at alternate junctures of said stacks for inletting fuel and outletting oxidant from two consecutive stacks of said loop;

means disposed at other alternate junctures of said stacks for inletting oxidant and outletting fuel from two consecutive stacks; and means for flowing a coolant to said coolant inlets, through said stacks, and into said enclosure duct.

7. A method of arranging a plurality of fuel cell stacks, each said stack shaped in cross-section as a polygon having pairs of oppositely-disposed peripheral faces and including means for flowing a fuel therethrough from fuel inlets on a peripheral face to fuel outlets on an oppositely disposed peripheral face, means for flowing an oxidant therethrough from oxidant inlets on a peripheral face to oxidant outlets on an oppositely-disposed peripheral face, and means for flowing a coolant therethrough from coolant inlets on a peripheral face which is a different peripheral face than said fuel and oxidant peripheral faces to coolant outlets on a peripheral face which is a different peripheral face than said fuel and oxidant peripheral faces, said method comprising:

placing an even number, and at least four of said stacks in a loop such that said coolant inlet peripheral faces face outwardly of said loop and said coolant outlet peripheral faces face inwardly of said loop;

sealing among consecutive stacks of said loop such that the interior of said loop forms an enclosure duct;

positioning ducts at alternate junctures of said stacks for inletting fuel and outletting oxidant from two consecutive stacks of said loop; and positioning ducts at other alternate junctures of said stacks for inletting oxidant and outletting fuel from two consecutive stacks.

* * * * *